May 18, 1965   E. D. KLUG   3,184,526
MANUFACTURE OF POLYOLEFIN FILM
Filed Feb. 8, 1962
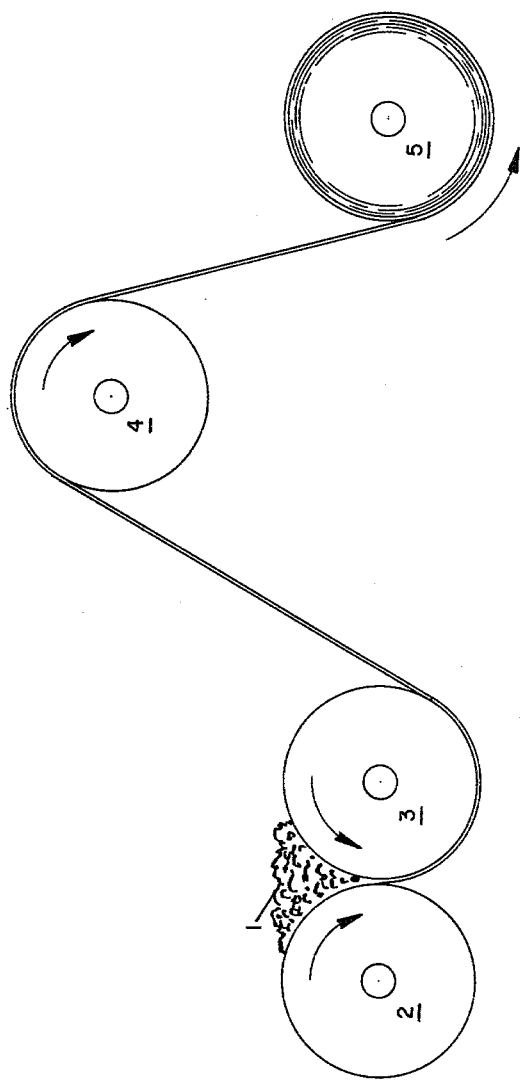
EUGENE D. KLUG
INVENTOR.
BY Ernest J. Peterson
AGENT

United States Patent Office 3,184,526
Patented May 18, 1965

3,184,526
MANUFACTURE OF POLYOLEFIN FILM
Eugene D. Klug, Wilmington, Del., assignor to Hercules Powder Company, Wilmington, Del., a corporation of Delaware
Filed Feb. 8, 1962, Ser. No. 171,854
4 Claims. (Cl. 264—175)

The present invention relates to a method for the production of self-supporting films from normally solid polyolefins, such as polyethylene or stereoregular polypropylene.

Such polyolefins are well known and have many established uses. One of the uses that has been proposed for the polymer is in the manufacture of film. Melt casting and solution casting are among the methods that have been suggested for this purpose. Melt casting techniques have the disadvantage that the prolonged heating necessary for melting and extruding the polymer sometimes adversely affects to the properties of the polymer. In order to minimize the heat during extrusion, the art has resorted to solution casting techniques. More specifically, conventional solution casting involves forming a solution of the polymer by dissolving dry polymer in a suitable organic solvent and extruding the solution through a suitable die onto a surface using an atmosphere of heated gas to evaporate the solvent and solidify the film. Solution casting of film from polyolefins, such as polyethylene or polypropylene, however, has the drawbacks of requiring a separate step to bring the difficultly soluble polymer into solution as well as the expense of drying chambers or other apparatus required to evaporate solvent from the extrudate.

According to the present invention, there is provided a process for making self-supporting polyolefin film that avoids the high temperatures required for melt extrusion and at the same time avoids the separate step of putting the polymer into solution. Additionally, the process is particularly suited to olefins which are polymerizable in the presence of a diluent, in which case prior separation of the diluent from the polyolefin is not necessary.

The present invention is based on the finding that it is possible to calender diluent-wet polymer in such a way that diluent is evaporated from the polymer while simultaneously producing clear, self-supporting film.

More explicitly, the process of this invention for making film from a normally solid polyolefin, such as polyethylene or stereoregular polypropylene, comprises feeding the polyolefin in the form of fine particles wet with an inert liquid organic diluent in the amount of 0.25 to 1.5 times the weight of the polyolefin into the nip formed by a pair of closely spaced rolls rotating on parallel axes in opposite direction and maintained at an elevated temperature below the melting point of the polyolefin but above the temperature at which the polyolefin is soluble in the diluent, thereby forming a continuous layer of the polyolefin adherent to one of said rolls, and then stripping said layer as a self-supporting film from the rolls, said diluent having a boiling point ranging from at least about 100° C. up to about 40° C. above the melting point of the polyolefin and being a solvent for said polyolefin to the extent of at least about 15% by weight at temperatures not more than about 50° C. below the melting point of the polyolefin and above, and being essentially a nonsolvent for the polyolefin at temperatures more than 80° C. below the melting point of the polyolefin.

While the success of the invention is not fully explainable, it is believed that it is attributable to the manner in which the polymer is heated, sheared and compressed by the rolls in the presence of the diluent. In any event, it has been found that the transfer of heat from the heated rolls to the diluent-wet polymer within the period of time that it takes for the rolls to turn through about 180° leads to the formation of a self-supporting film which may then be oriented by known techniques. Certain, in any event, is the fact that any serious departure from the process conditions as described results in a loss of its advantages.

The process of the invention will be more fully described with reference to the attached drawing that shows diagrammatically a preferred arrangement of apparatus for carrying out the process of the invention and for performing a subsequent orientation step to produce oriented film. Referring to the drawing, a mass of polyolefin flake 1 is wet with an equal amount by weight of diluent, for example, xylene, and is deposited at the nip of two oppositely rotating calender rolls 2 and 3 adjusted to provide a nip spacing conforming to any particular film thickness desired, for instance, from 10 mils down to 0.25 mil. Both rolls 2 and 3 are heated, preferably internally, to a temperature below the melting point of the polyolefin being utilized but above the temperature at which the same polyolefin is soluble in the particular diluent; in the case of xylene and stereoregular polypropylene, for example, preferably to about 150 to 160° C. The roll 3, during operation, may be rotated at a greater surface linear velocity than calendar roll 2 with the result that the mass deposited at the nip will be extruded between the nip of rolls 2 and 3 to form a coating of substantially uniform thickness conforming to the spacing of the nip, adherent to the surface of calender roll 3. Preferably, rolls 2 and 3 have a diameter of about 0.5 foot to about 3 feet, roll 2 rotating at a surface linear velocity of about 4 to 100 feet per minute and roll 3 at a velocity of about 4 to about 125 feet per minute. The layer of polyolefin is then stripped from calendar roll 3 as a self-supporting film and stretched to give it orientation as it passes to cylindrical roll 4 which is maintained at about room temperature or below and rotates at a peripheral speed of 5 to 125 feet per minute. Normally, the film as it leaves roll 3 will contain some residual diluent, most of which will evaporate in the travel of the film from roll 3 to roll 4. If desired, however, the film may be passed, prior to stretching, through an oven or equivalent apparatus to provide for substantially complete evaporation of the diluent.

The film, after contacting roll 4, is then fed to wind-up roll 5, or, if additional orientation is desired, to conventional heating and stretching apparatus not shown.

The process will be specifically described with reference to the manufacture of film stereoregular polypropylene having a birefringent melting point of about 168° C. and a reduced specific viscosity of about 3.5 determined at 135° C. on a solution of 0.1 g. of the polymer in 100 ml. of decahydronaphthalene. All parts and percentages are by weight unless otherwise specified.

Illustrating the embodiment of the invention described in the drawing, 100 parts stereoregular polypropylene in the form of particles having maximum dimensions ranging from about 5 to 385 microns was stirred into 175 parts xylene and to this slurry was added as stabilizers 0.5 part dilauryl thiodipropionate and 0.5 part of the reaction product of 2 moles of p-nonylphenol and 1 mole of acetone in the presence of an acid catalyst, the reaction product comprising a mixture of isopropylidene-bis(nonylphenol) and 2(2'-hydroxyphenyl)-2,4,4-trimethyl - 5',6-dinonylchlroman. After agitating until the stabilizers dissolved, excess liquid was filtered off leaving a paste-like xylene-wet polymer having approximately the following composition: 100 parts polypropylene; 100 parts xylene; and 0.25 part of each stabilizer. The xylene-wet polymer was fed into the nip of calendar rolls 2 and 3 adjusted to provide a nip spacing of 1 mil, each roll having a diameter of 6 inches, a surface temperature of about 160° C., and a peripheral speed of 4 feet per minute. A self-supporting film was stripped from roll 3 at a point approximately 180° from the point of initial contact onto roll 4 having a diameter of 0.5 foot, a surface temperature of about 20° C., and a peripheral speed of 8.5 feet per minute. From roll 4 the film, now linearly oriented, was transferred to wind-up roll 5. The final film properties were as follows:

Thickness _____ 1 mil.
Tensile strength (machine direction) _____ 5300 p.s.i.
Elongation _____ 7%.
Tensile modulus _____ 410,000 p.s.i.
Solvent content of film:
    At point of stripping from roll 3 _____ Approx. 15%.
    At point of transferral to roll 5 _____ Approx. 5%.

As the example has shown, the process of the invention makes it possible to produce self-supporting film which can be linearly oriented into a film of good quality. The process has the further advantage of being performable economically by means of relatively simple apparatus.

The example has illustrated a typical procedure within the scope of the invention. It is within the skill of the art to select optimum conditions within the limits previously set forth and to vary other process conditions according to the ultimate film properties desired, as will be obvious from the following comments.

Although the invention is applicable to any polymer of an α-monoolefin, it is particularly useful with polymers of monoolefins having 2 to 6 carbons, including, for instance, polyethylene, either low or high density, polypropylene, poly(butene-1), poly(pentene-1), poly(3-methyl butene-1), and poly(4-methyl pentene-1).

The invention requires the employment of an inert organic diluent in which the polyolefin is soluble to the extent of at least about 15% by weight at temperatures not more than 50° C. below the melting point of the polyolefin and above, but in which the same polyolefin is essentially insoluble at temperatures more than 80° C. below the melting point of the same polyolefin. Also, the diluent will be one which has a boiling point ranging from at least about 100° C. up to about 40° C. above the melting point of the same polyolefin. Numerous diluents meet these qualifications, but each would not be practical for every polyolefin. The selection of a suitable diluent within the limits of this invention for a particular polyolefin is considered to be within the skill of the art. Exemplary diluents include saturated aliphatic hydrocarbons, such as n-decane, n-undecane, dodecane and petroleum fractions that boil within the above range. Other useful diluents are aromatic hydrocarbons, such as xylene, cumene, p-cymene, etc., and saturated cycloaliphatic hydrocarbons, such as methyl cyclohexane, ethyl cyclohexane, etc.

In the practice of the invention it is desirable that the polyolefin be wetted with 0.25 to 1.5 times its weight of diluent. The use of less than the specified amount of diluent does not significantly lower the processing temperature over that which would be required for dry polymer. On the other hand, the use of more than the maximum amount of diluent specified gives a thin slurry which lacks form and structure and cannot be processed satisfactorily.

In addition to the essential steps of the invention already discussed numerous other optional steps are permissible. Thus, for instance, when the olefin is polymerizable in the diluent it is possible to use as feed a slurry of the polymer in the diluent in which it is polymerized without prior separation of polymer, provided, of course, that the weight of diluent in the slurry is adjusted, if necessary, e.g., by decanting, to the range of 0.25 to 1.5 times the weight of the polymer. If desired, any residual diluent that may remain in the film can be stripped from the film by stretching in an atmosphere of heated gas, for example, air nitrogen, carbon dioxide or steam, which serves to evaporate the diluent. It is also possible to remove traces of water, gas or foreign matter from the feed whenever such steps are found desirable. Additionally, it is possible to incorporate in the feed additives such as stabilizers, dyes, antacids, and the like.

What I claim and desire to protect by Letters Patent is:
1. The method of producing a self-supporting film from a normally solid polyolefin which comprises feeding said polyolefin in the form of fine particles wet with an inert liquid organic diluent in the amount of 0.25 to 1.5 times the weight of the polyolefin into the nip formed by a pair of closely spaced rolls rotating on parallel axes in opposite direction and maintained at an elevated temperature below the melting point of said polyolefin but above the temperature at which said polyolefin is soluble in said diluent, thereby forming a continuous layer of said polyolefin adherent to one of said rolls, and then stripping said layer as a self-supporting film from the rolls, said diluent having a boiling point ranging from at least about 100° C. up to about 40° C. above the melting point of said polyolefin and being a solvent for said polyolefin to the extent of at least about 15% by weight at temperatures not more than about 50° C. below the melting point of said polyolefin and above, and being essentially a nonsolvent for said polyolefin at temperatures more than 80° C. below the melting point of said polyolefin.

2. The method of claim 1 wherein said polyolefin is polyethylene.

3. The method of claim 1 wherein said polyolefin is polypropylene.

4. The method of claim 3 wherein said diluent is a hydrocarbon.

References Cited by the Examiner
UNITED STATES PATENTS

| | | | |
|---|---|---|---|
| 2,313,144 | 3/43 | Gomm | 260——94.9 |
| 2,631,954 | 3/53 | Bright | 18—57 X |
| 2,829,118 | 4/58 | Wehr. | |
| 2,848,752 | 4/58 | Bechtold | 117—36.7 X |
| 2,971,858 | 2/61 | Giulio et al. | |
| 3,042,971 | 7/62 | Wolinski | 264—83 XR |

ALEXANDER H. BRODMERKEL, *Primary Examiner.*
MORRIS LIEBMAN, *Examiner.*